US008925401B2

(12) United States Patent
Auerswald et al.

(10) Patent No.: US 8,925,401 B2
(45) Date of Patent: Jan. 6, 2015

(54) MEASURING APPARATUS COMPRISING A MEASURING PROBE AND A SECUREMENT APPARATUS

(75) Inventors: Lothar Auerswald, Dobeln (DE); Christian Fanselow, Geringswalde (DE)

(73) Assignee: Endress + Hauser Conducta Gesellschaft fur Mess- und Regeltechnik mbH + Co. KG, Gerlingen (DE)

( * ) Notice: Subject to any disclaimer, the term of this patent is extended or adjusted under 35 U.S.C. 154(b) by 384 days.

(21) Appl. No.: 13/382,955

(22) PCT Filed: Jun. 22, 2010

(86) PCT No.: PCT/EP2010/058779
§ 371 (c)(1), (2), (4) Date: Jan. 9, 2012

(87) PCT Pub. No.: WO2011/003729
PCT Pub. Date: Jan. 13, 2011

(65) Prior Publication Data

US 2012/0186370 A1 Jul. 26, 2012

(30) Foreign Application Priority Data

Jul. 9, 2009 (DE) ......................... 10 2009 027 581

(51) Int. Cl.
*G01N 27/28* (2006.01)
*G01D 11/24* (2006.01)

(52) U.S. Cl.
CPC ...................................... *G01D 11/24* (2013.01)
USPC ......................................................... 73/866.5

(58) Field of Classification Search
None
See application file for complete search history.

(56) References Cited

U.S. PATENT DOCUMENTS 4,489,596 A * 12/1984 Linder et al. ............... 73/114.19
6,011,391 A 1/2000 Nix
6,705,898 B2 3/2004 Pechstein
8,217,561 B2 * 7/2012 Fukuzawa et al. ............ 313/141
(Continued)

FOREIGN PATENT DOCUMENTS

CN 101454643 * 6/2009
DE 10218606 A1 6/2003
(Continued)

OTHER PUBLICATIONS

International Search Report, EPO, The Netherlands, Sep. 28, 2010.
German Search Report, German PTO, Munich, May 17, 2010.

* cited by examiner

*Primary Examiner* — Robert R Raevis
(74) *Attorney, Agent, or Firm* — Bacon & Thomas, PLLC

(57) ABSTRACT

A measuring apparatus, especially a measuring apparatus suitable for application in industrial process measurements technology for making measurements of physical or chemical, measured variables in a closed process container under increased pressure, comprising: a measuring probe, which has a probe shaft, especially a cylindrical probe shaft; and a securement apparatus to affix the measuring probe at a measuring point, wherein the securement apparatus comprises a sleeve, which at least sectionally accommodates probe shaft, wherein the measuring probe has a securement collar connected to the probe shaft; the securement collar is held, especially shape interlocked, between a coupling jacket releasably secured in sleeve and a counterbearing formed within sleeve, characterized in that, a first abutment surface is formed within the coupling jacket, and a second abutment surface, which lies opposite the first abutment surface, is formed on measuring probe.

13 Claims, 4 Drawing Sheets a) L 113 111 119 129 128 130 131 A 127 121 124 123 107 105 P 125 108 103 115 117 d2 109 110 112

101 b) 119 129 128 130 133 139 d1 137 131 121 124 135 105 123

(56) References Cited

U.S. PATENT DOCUMENTS

| | | | |
|---|---|---|---|
| 2004/0194563 | A1 | 10/2004 | Milanovic |
| 2005/0155408 | A1* | 7/2005 | Weyl et al. .................. 73/23.31 |
| 2008/0134811 | A1 | 6/2008 | Milanovic |
| 2008/0271548 | A1 | 11/2008 | Janz |
| 2010/0045312 | A1 | 2/2010 | Pechstein |
| 2010/0126288 | A1 | 5/2010 | Osswald |

FOREIGN PATENT DOCUMENTS

| | | | |
|---|---|---|---|
| DE | 10218606 | A1 | 11/2003 |
| DE | 102006053399 | A1 | 5/2008 |
| DE | 10 2006 058069 | A1 | 6/2008 |
| EP | 1206012 | A2 | 5/2002 |
| EP | 1 464 951 | A2 | 10/2004 |

a)
L
13
11
19
1
29
28
31
A
27
30
21
23
24
24
P
7
5
3
8
25
15
17
12
b)
29
28
30
31
21
5
24
23 a)
L
113
111
119
101
128
129
130
131
A
127
121
124
123
107
P
105
125
108
103
115
117
d2
d1
109
110
112
b)
119
129
128
130
133
122
135
131
121
124
105
123

MEASURING APPARATUS COMPRISING A MEASURING PROBE AND A SECUREMENT APPARATUS

TECHNICAL FIELD

The invention relates to a measuring apparatus comprising a measuring probe, which has a probe shaft, especially a cylindrical probe shaft, and a securement apparatus for affixing the measuring probe at a measuring point. The invention furthermore comprises a corresponding measuring probe and a coupling jacket to mechanically affix such a measuring probe to a securement apparatus.

BACKGROUND DISCUSSION

Measuring probes, for example, for determining pH values, ion concentrations, gas concentrations, conductivity, turbidity or other physical or chemical variables in a measured medium, have at least one end section immersed in the measured medium to take a measurement. Such measuring probes can be used, for example, in the area of industrial process measurements technology for determining and monitoring, the aforementioned measured variables of a process medium in a process. The end section immersed in the measured medium is also referred to as the immersion region of the measuring probe. In the immersion region, the measuring probe can have a measuring membrane, electrodes, coils, or one or a number of optical windows, for example, which serve to record and/or produce a signal correlated to the measured variable. In order to hold a measuring probe in a determined position in such a manner that the immersion region plunges into the measured medium with a predetermined immersion depth, for example, it is usually affixed to a securement apparatus, also referred to as a retractable assembly, in the selected position relative at a measuring point. There are various types of measuring points. A measuring point can be an open vessel in a laboratory, a vat in a clarification plant or a process vessel of a chemical plant open or closed to the environment, especially a pipe conveying media in such a plant, for example.

Typically, the aforementioned measuring probes have a probe shaft, which is frequently essentially rotationally symmetric. The term "rotationally symmetric" here refers to the geometric shape of the measuring probe or of the probe shaft. Such a measuring probe can be housed in a sleeve of the securement apparatus, for example. For affixing the measuring probe, the measuring probe can have an orbiting securement collar on the probe shaft; the securement collar is held shape interlocked by means of a releasably affixed coupling jacket in the sleeve; the releasably affixed coupling jacket presses the securement collar against a counterbearing, e.g. a ledge, provided in the sleeve. FIG. 1 shows such a measuring apparatus according to the state of the art. The measuring apparatus is described in further detailed below.

The measuring apparatus of FIG. 1 can be applied very advantageously at a measuring point under increased pressure, for example, for the execution of measurements in a measured medium, which is under increased pressure in a closed process vessel. The pressure reigning in the process vessel affects a force (arrow P) acting axially on the measuring probe in a direction facing away from the process. This force is opposed by the securement collar pressing against the ledge.

If the process pressure, however, is too high or an aging of the securement collar material arises, the tensile force acting on the securement collar can lead to a fracturing of the securement collar. This situation is shown in FIG. 2, which is explained in further detail below. If the securement collar fractures, the force due to the process pressure acting on the measuring probe affects a movement of the measuring probe in an axial direction away from the ledge, i.e. in a direction away from the process. In the case of a high pressure difference between the interior of the process container and the environment, the measuring probe can be completely forced out of the sleeve. Even if the measuring probe is only shifted within the sleeve, as shown in FIG. 2, the danger is that the immersion region of the measuring probe no longer plunges sufficiently deep into the process medium to permit sufficiently accurate measurements. Moreover, the axial shifting of the measuring probe within the sleeve can lead to a sufficient sealing of the process container relative to the securement apparatus or relative to the environment no longer being assured, so that medium can exit into the environment from the process container via the securement apparatus.

SUMMARY OF THE INVENTION

It is therefore an object of the invention to provide a measuring apparatus of the type described above, which is suitable for a measuring point under increased pressure, and which overcomes the disadvantages of the state of the art. Especially, the measuring probe at the measuring point should still be operable in the case of a fracturing of the securement collar and a danger of an uncontrolled leak of aggressive media should be prevented.

This object is achieved by a measuring apparatus comprising:

a measuring probe, which has a probe shaft, especially a cylindrical probe shaft; and a securement apparatus to affix the measuring probe at a measuring point, especially in a process container under increased pressure; wherein the securement apparatus comprises a sleeve, within which the probe shaft is accommodated at least sectionally; wherein the measuring probe has a securement collar connected to the probe shaft; the securement collar is held, especially shape-interlocked, between a coupling jacket releasably secured in the sleeve and a counterbearing formed within the sleeve; wherein a first abutment surface is formed within the coupling jacket, and wherein a second abutment surface lying opposite the first abutment surface is formed on the measuring probe.

In the basic function state of the measuring apparatus, i.e. in the case of the measuring probe being correctly affixed in the sleeve by an intact securement collar, the first and second abutment surfaces can lie axially spaced relative to one another. In the case of a fracturing of the securement collar, the measuring probe can then only move so far in an axial direction away from the medium until these two abutment surfaces contact one another. Further movement is suppressed. The combination of the first abutment surface formed within the coupling jacket and the second abutment surface formed on the measuring probe assures, thus, that the measuring probe remains affixed in the sleeve in the case of a fracturing of the securement collar and—with a corresponding choice of the axial separation between the two abutment surfaces in the basic function state—that the immersion region of the measuring probe remains immersed deeply enough in the measured medium.

The counterbearing within the sleeve can be formed as an inwardly extending ledge of the sleeve. Such an inwardly extending ledge can be embodied as a transitional region between a first section of the sleeve with a first inner diameter and a second section, following the first section of the sleeve, with a second inner diameter, which is larger than the first inner diameter. The transition between the first and the second section can be abrupt, i.e. in the manner of a step, so that the ledge forms an annular surface oriented perpendicularly to the longitudinal axis of the sleeve or perpendicularly to a longitudinal axis of a probe shaft held within the sleeve. However, the transition can also occur gradually, e.g. through a linear or quadratic increase of the inner diameter in reference to the axial separation of the end of the first section of the sleeve, so that the ledge is inclined compared to the longitudinal axis of the sleeve or the longitudinal axis of the probe shaft, e.g. the ledge has the form of a conical surface.

A first face of the securement collar can contact the counterbearing in the sleeve, e.g. directly on the described ledge; or through an intermediary of at least one additional element, especially a sealing element, e.g. an elastic sealing ring.

An end face or a radially inwardly extending ledge of the coupling jacket can contact the second face of the securement collar facing away from the counterbearing formed in the sleeve directly or through an intermediary of at least one additional element, especially a sealing element, e.g. an elastic sealing ring.

The securement collar connected to the probe shaft can be embodied either as a piece of the probe shaft, e.g. as a ridge of the probe shaft, or it can be a component of an additional element of the measuring probe connected to the probe shaft, e.g. as part of a connector assembly serving to connect the measuring probe to a superordinated unit. For example, the measuring probe can have an insulating cap in the region of the connector assembly; the insulating cap simultaneously serves for the mechanical connection of the connector assembly with a cable, which connects the measuring probe to a superordinated unit, wherein the securement collar is embodied as a collar of the insulating cap.

In a preferred embodiment, the coupling jacket is at least sectionally arranged within the second section of the sleeve surrounding a section of the probe shaft.

In an additional embodiment, the sleeve, especially the inner lateral surface of the sleeve, the probe shaft and the coupling jacket have a shared longitudinal axis, especially a rotational axis. The direction along or parallel to this longitudinal axis is referred to as "axially' or "axial direction".

The coupling jacket can have an external thread, which interacts with an internal thread in the second section of the sleeve, in order to releasably secure the coupling jacket in the sleeve and to bring the end face or the radially inwardly extending ledge of the coupling jacket in contact with the securement collar of the probe shaft, and especially to exert pressure on the securement collar supported by the counterbearing in the sleeve, so that the securement collar is held pressed between the coupling jacket and the counterbearing formed in the sleeve, in given cases, via at least one sealing element.

The first abutment surface, i.e. the abutment surface within the coupling jacket, can be formed so that the inner diameter of the coupling jacket, at least in a subsection of the coupling jacket, decreases, especially continuously decreases, e.g. linearly, with increasing axial distance from the end face or a ledge of the coupling jacket bearing against the securement collar of the measuring probe. For example, the inner lateral surface of the coupling jacket within said subsection can form a conical inner surface as an abutment surface.

The second abutment surface, i.e. the abutment surface of the measuring probe, can be formed so that the outer diameter of the measuring probe, at least in a subsection of the probe shaft, decreases, especially continuously, e.g. linearly, with an increasing axial distance from the securement collar. For example, the outer lateral surface of a section of the measuring probe, e.g. the probe shaft or an element of the measuring probe connected to the probe shaft, can form a conical outer surface in said subsection. Especially, the second abutment surface can be formed on an element connected to the probe shaft, e.g. on an electrically insulating cap of a connector assembly of the measuring probe described above. Alternatively, a ring, which has a conical lateral surface and runs around the probe shaft radially, which serves as an abutment surface in this case, can also be secured to the probe shaft or the cap.

In an embodiment of the measuring apparatus, the measuring probe can have an immersion region in a first end section of the measuring probe, the immersion region protrudes out from the sleeve and is immersible in a measured medium in measurement operation; wherein within the first section, which has the first inner diameter, of the sleeve, a sealing ring is arranged, which lies against the probe shaft and seals off a gap formed between the inner lateral surface of the sleeve and the sensor shaft, from the immersion region, i.e. during operation the measuring probe is sealed against the measured medium.

In an advantageous further development of this embodiment, the axial length of the immersion region is greater than the distance between the first and second abutment surfaces in the basic function state. In this way, it is assured that, in the case of a fracturing of the securement collar, the immersion region is not completely retracted into the interior of the sleeve. In this way, it is simultaneously assured that the sealing ring mentioned above lies against the probe shaft and continues fulfilling its sealing function in the end position of the measuring probe after a fracturing of the securement collar, i.e. with the first and second abutment surfaces abutting one another.

The axial length of the immersion region is, for example, at least twice the length, preferably at least 10 times the length of the distance between the first and the second abutment surfaces.

If the first and the second abutment surfaces are embodied as conical lateral surfaces complementary to one another, the angle of inclination of each conical lateral surface deviates from one another less than 5°, especially less than 1° in a preferred embodiment. Thus the two surfaces lie flushly against one another in the case of a fracturing of the securement collar.

The invention also comprises a measuring probe comprising a probe shaft, especially a rotationally symmetric probe shaft, wherein the measuring probe has a securement collar connected to the probe shaft to affix the measuring probe in a securement apparatus, wherein the measuring probe has an additional abutment surface, which is especially formed so that in at a least a subsection of the measuring probe, the outer diameter of the measuring probe decreases, especially continuously decreases, with increasing axial distance from the securement collar.

For example, the outer diameter of the measuring probe can continuously decrease within a subsection of the probe shaft. For example, the outer lateral surface of a section of the measuring probe, e.g. the probe shaft or an element of the measuring probe connected to the probe shaft, can form a conical outer surface in said subsection. Especially, the second abutment surface can be formed on an element connected to the probe shaft, e.g. on an insulating cap of a connector assembly of the measuring probe already described above. Alternatively, a ring, which serves as an abutment surface in this case, with a conical lateral surface running radially around the probe shaft, can also be secured to the probe shaft.

As described above, the securement collar can be embodied as a piece of the probe shaft, e.g. as a ridge. The securement collar can also be a component of a component connected to the probe shaft, e.g. a collar of an insulating cap of a connector assembly for connecting the measuring probe to a superordinated unit.

The invention furthermore comprises a coupling jacket for the mechanical connection of the measuring probe described above, with a securement apparatus, which has a sleeve for accommodating at least one section of the probe shaft, wherein an abutment surface is formed within the coupling jacket, i.e. on its inner lateral surface; the abutment surface which is especially embodied so that the inner diameter of the coupling jacket decreases, especially continuously decreases, at least in a subsection of the coupling jacket, with increasing axial distance from an end face or an especially inwardly extending ledge of the coupling jacket.

The coupling jacket can be pushed onto at least one section of the probe shaft of the measuring probe and surround the measuring probe.

Preferably, the outer lateral surface of the coupling jacket has an external thread for the releasable securement of the coupling jacket at least in a subsection of a sleeve of the securement apparatus, which correspondingly has a complementary internal thread.

BRIEF DESCRIPTION OF THE DRAWINGS

The invention will now be explained in greater detail based on the example of an embodiment illustrated in the drawing. The figures of the drawing show as follows:

FIG. 2 *a*) is the measuring apparatus of FIG. 1 in the case of a fracturing of the securement collar;

FIG. 2 *b*) is a detail view of the measuring apparatus in FIG. 2 *a*);

FIG. 3 *b*) is a detail view of the measuring apparatus in FIG. 3*a*) in the area of the securement collar of the measuring probe;

FIG. 4 *b*) is a detail view of the measuring apparatus in FIG. 4 *a*).

DETAILED DISCUSSION IN CONJUNCTION WITH THE DRAWINGS

Figure 1:
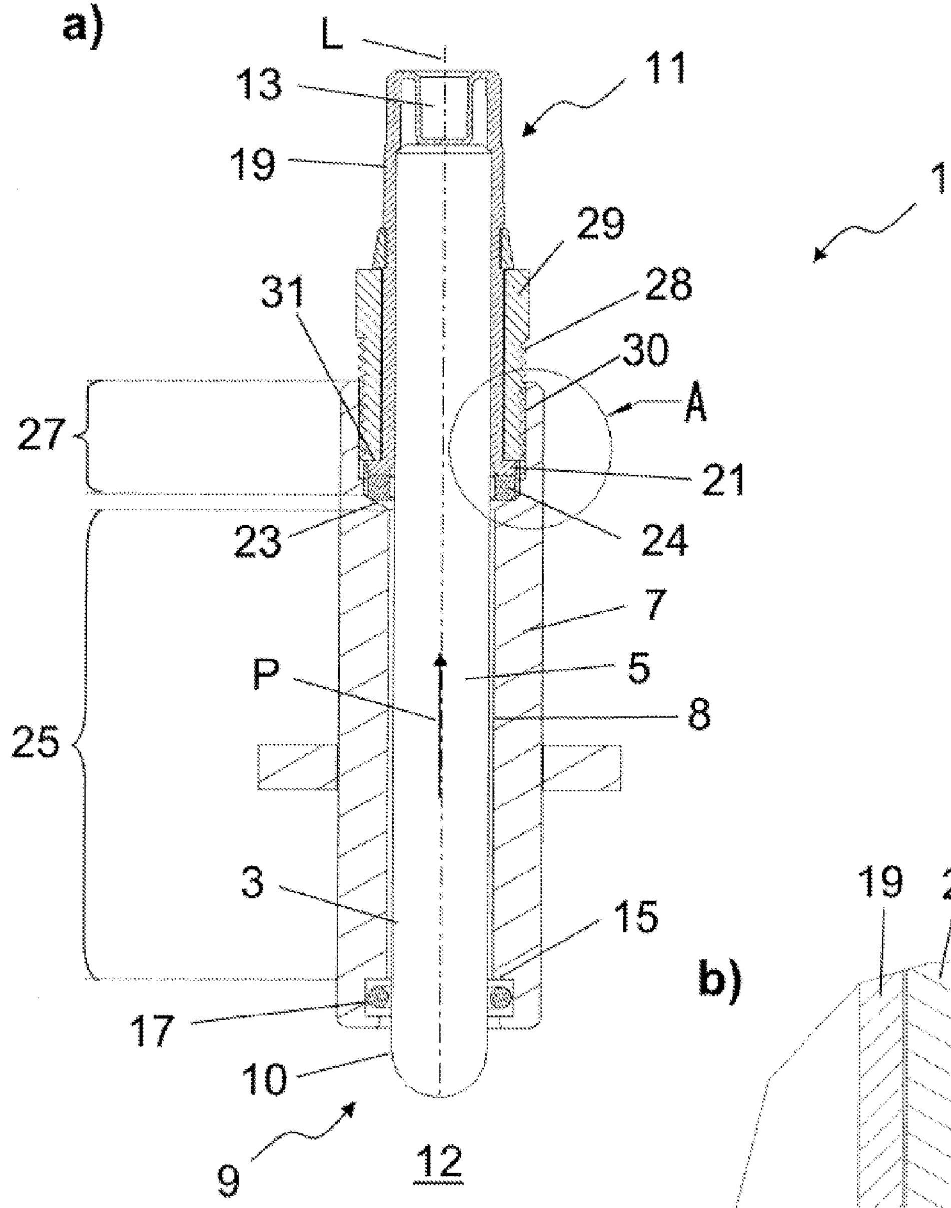
FIG. 1 *a*) is a measuring apparatus according to the state of the art.
Figure 1:
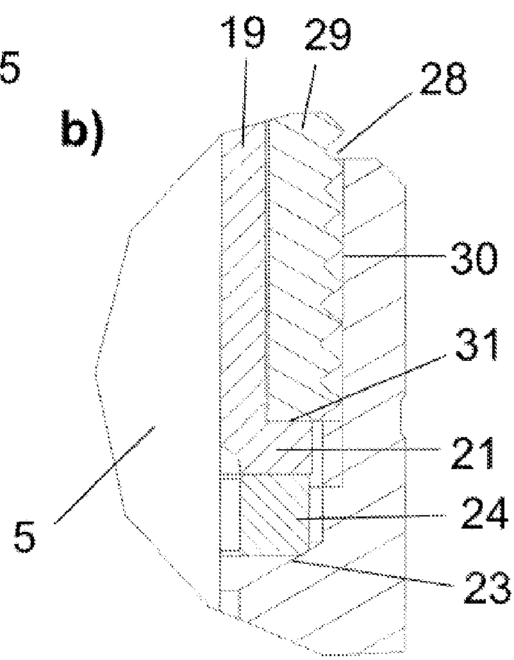

In FIG. 1 *a*) a measuring apparatus 1 according to the state of the art is presented, in which a measuring probe 3 is affixed with its probe shaft 5 in a sleeve 7, which can be a component of a securement apparatus not illustrated here. Sleeve 7 has a cylindrical inner wall 8, which surrounds a section of probe shaft 5. Probe shaft 5 has a rotationally symmetric geometric shape. The immersion region 10 of measuring probe 3, i.e. the region, which is immersed in measurement operation in a measured medium 12, especially a liquid medium, is located in a first end section 9, which is on the process side during operation of measuring probe 3. In the region of first end section 9, a sealing ring 17 is arranged in a groove 15 extending in the inner lateral surface 8 of sleeve 7; sealing ring 17 lies against probe shaft 5, so that the interior of sleeve 7, especially the annular gap formed between inner lateral surface 8 and probe shaft 5, is sealed liquid tightly from the environment.

In a second end section 11, which lies opposite first end section 9, measuring probe 3 has a connector assembly 13, via which the measuring probe 3 can be connected to a superordinated unit (not shown), for example, a measurement transmitter, for the transmission of data and energy. Connector assembly 13 can be embodied, for example, as a primary side of a pluggable connector coupling, and comprise an electronics assembly, which comprises the circuits for processing and forwarding the signal of the measuring probe. In the case of the measuring probe 3 illustrated in FIG. 1, connector assembly 13 is embodied as a primary side of an inductive coupling plugged connection, as is described, for example, in EP 1 206 012 A1 or DE 102 18 606 A1. Connector assembly 13 comprises an electrically insulating cap 19 surrounding connection section 11 of the measuring probe; electrically insulating cap 19 can comprise a synthetic material, such as a plastic, for example.

Both end sections 9 and 11 of measuring probe 3 extend out from sleeve 7. The probe shaft 5 has a longitudinal axis L, which forms a shared rotational symmetry axis of measuring probe 3, probe shaft 5 and sleeve 7 in the present example. For axially affixing measuring probe 3 with reference to the longitudinal axis L, cap 19 has a securement collar 21, which axially supports measuring probe 3 in the installed state in sleeve 7 on a ledge 23 formed within sleeve 7 and serving as a counterbearing, wherein a sealing ring 24 is arranged between the outer face of securement collar 21 and ledge 23. FIG. 1 *b*) shows an enlarged representation of the area of measuring apparatus 1 labeled with an A in FIG. 1 *a*), in which the affixing of measuring probe 3 in sleeve 7 by means of securement collar 21 and the coupling jacket 29 is to be seen. Ledge 23 is formed by a transitional region between a first section 25 and an adjacent second section 27 of sleeve 7, wherein sleeve 7 has a smaller inner diameter in first section 25 than in second section 27.

Coupling jacket 29 serves to affix measuring probe 3 in sleeve 7. Coupling jacket 29 has an external thread 28, which is complementary to an internal thread 30 of second section 27 of the sleeve. In this way, coupling jacket 29 can be screwed into second section 27 of sleeve 7. In the installed state of measuring probe 3 for the measurement operation, the coupling jacket 29 is screwed so far into sleeve 7 that its end face 31 lies against the inner face of securement collar 21 of measuring probe 3 facing away from ledge 23 serving as the counterbearing. Preferably, the coupling jacket 29 is screwed so far into sleeve 7 that its end face 31 exerts a compressive pressure on securement collar 21 against sealing ring 24 and ledge 23.

Measuring apparatus 1 can be applied very advantageously at measuring points having increased pressure. For example, measuring apparatus 1 can be secured to a process container, which is under pressure higher than ambient pressure. The pressure reigning at the measuring point effects a force on measuring probe 3 in the direction of the arrow P. This force is counteracted by the pressing force exerted against the ledge 23 by the coupling jacket 29 on securement collar 21. Since this counterforce acts in an axial direction, but offset from the axis, namely on securement collar 21 radially spaced from the central axis L, a tensile force acting on securement collar 21 results. This can lead to a fracturing of securement collar 21 when the pressure is too high at the measuring point or with aging of the securement collar material. This situation is presented in FIGS. 2 *a*) and *b*), wherein FIG. 2 *b*) shows an enlarged representation of the area marked with an A in FIG.

Figure 2:
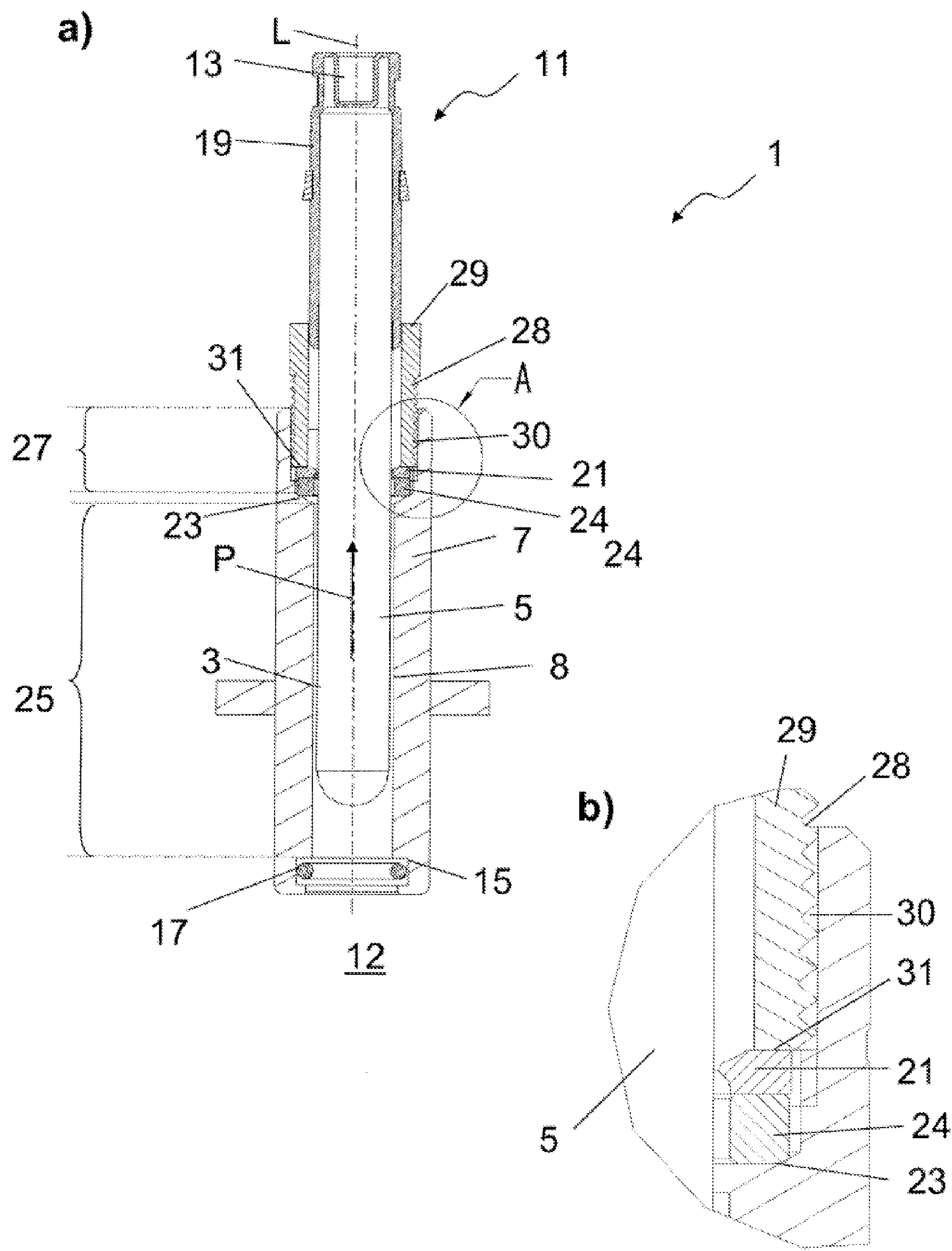
FIG. 2 *b*) is a detail view of the measuring apparatus in FIG. 1 *a*) in the area of the securement collar of the measuring probe.

2. If securement collar 21 fractures, the force P effected by the process pressure, now unopposed, acting axially on the measuring probe effects a movement of measuring probe 3 in an axial direction away from measured medium 12. The measuring probe is thus pressed out of sleeve 7. This can especially lead to the end section 9 being retracted behind the seal 17, as shown in FIG. 2. In this case, the measuring point is no longer sealed. If the measuring point is a process container under pressure and closed against the environment, for example, the annular gap between inner lateral surface 8 of sleeve 7 and probe shaft 5 forms a leak, which first causes a pressure drop at the measuring point and, in given cases, allows the measured medium to escape into the environment.

Figure 3:
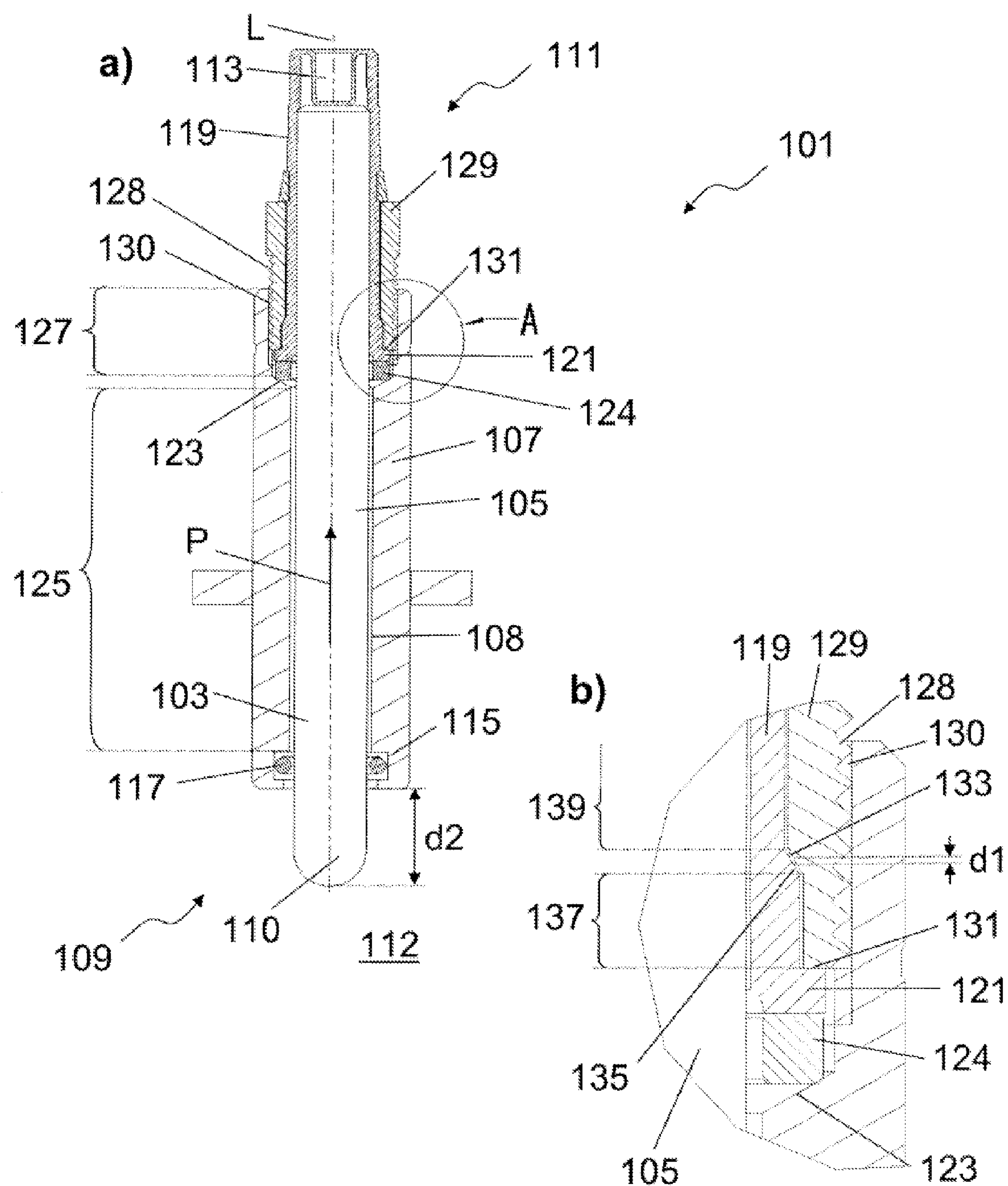
FIG. 3 *a*) is a measuring apparatus with retention of the measuring probe.

FIG. 3 *a*) shows a measuring apparatus 101, which is so embodied that the problems arising from a fracturing of the securement collar previously described are prevented. The measuring apparatus 101 comprises a measuring probe 103 with a rotationally symmetric probe shaft 105. A section of probe shaft 105 is accommodated in a sleeve 107, which is a component of a securement apparatus, e.g. a process assembly, which is not illustrated here, so that a narrow annular gap is formed between the inner lateral surface 108 of sleeve 107 and the section of probe shaft 105 surrounded by sleeve 107.

As in the examples in FIGS. 1 and 2, the probe shaft 105 comprises a first end section 109 protruding out from sleeve 107; first end section 109 comprises, on the process side, the immersion region 110 of measuring probe 103, which is immersed in the measured medium 112 during operation. The annular gap formed between inner lateral surface 108 of sleeve 107 and probe shaft 105 is sealed liquid tightly against measured medium 112 by means of a sealing element 117 affixed in the groove 115 in the inner lateral surface 108.

Measuring probe 103 furthermore comprises a second end section 111 opposite the first end section 109. Second end section 111 has a connector assembly 113, which is analogously embodied as the connector assembly 13 of measuring probe 3 shown in FIGS. 1 *a*) and 2 *a*). As in the case of measuring probe 3 in FIG. 1, connector assembly 113 has an electrically insulating cap 119 covering the connection side of measuring probe 103; electrically insulating cap 119 can comprise a synthetic material, a plastic, for example. To axially affix the measuring probe 103, the cap 119 has a securement collar 121, which is axially supported in the installed state of measuring probe 103 on a ledge 123 extending inwardly within sleeve 107 via a sealing ring 124 lying therebetween. As with ledge 23 of sleeve 7, illustrated in FIGS. 1 *a*) and 2 *a*), ledge 123 is formed by a transitional region between a first section 125 of the sleeve and a second section 127 of the sleeve, wherein first section 125 has a smaller inner diameter than second section 127. The transition between first section 125 and second section 127, in the example in FIG. 3, occurs through a gradual increase of the inner diameter of the sleeve starting at the end of first section 125 and continuing until the second inner diameter is reached. The ledge 123 is thus embodied as a conical inner surface between first section 125 and second section 127 of sleeve 107. Alternatively, an abrupt, i.e. stepped transition between first section 125 and second section 127 is also possible. In this case, ledge 123 would be an annular surface oriented perpendicularly to the axis L. Other embodiments of ledge 123 are also possible, as long as the ledge has a sufficient radial extent to axially support securement collar 129.

In the present example the securement collar 121 is a component of cap 119 of the connector element; however, many variants are conceivable. For example, the securement collar can also be embodied in one piece with probe shaft 105, e.g. as a ridge, or as a ring surrounding probe shaft 105 and secured to probe shaft 105.

As in measuring apparatus 1 shown in FIGS. 1 and 2, a coupling jacket 129 also serves in measuring apparatus 101, illustrated in FIG. 3 *a*), to affix measuring probe 103 in sleeve 107. The coupling jacket 129 has an external thread 128 complementary to an internal thread 130 of second section 127 of the sleeve. Thus, coupling jacket 129 can be screwed into second section 127 of sleeve 107.

FIG. 3 *b*) shows an enlarged representation of the region of measuring probe 101 marked with an A in FIG. 3 *a*), in which the affixing of measuring probe 103 in sleeve 107 by means of the securement collar 121 and coupling jacket 129 is to be seen. Securement collar 121, with its outer face facing the medium, lies above a sealing ring 124 on the conical ledge 123 formed on inner lateral surface 108. The inner face of securement collar 121 facing away from ledge 123 lies against an end face 131 of coupling jacket 129. In this arrangement end face 131 of coupling jacket 129 presses securement collar 121 via sealing ring 124 against ledge 123, which serves as counterbearing, so that securement collar 121 is shape interlocked and held pressed between coupling jacket 129 and ledge 123. In a variant, a sealing element can also be provided between end face 131 of coupling jacket 129 and the inner face of securement collar 121 facing away from ledge 123.

The coupling jacket 129 has a first section 137. A transitional region connects this first section 137 to a second section 139, which has a smaller inner diameter than first section 137. The transitional region between first section 137 and second section 139 of coupling jacket 129 is formed by a subsection lying between the first and second section; the inner diameter of coupling jacket 129 continuously decreases with increasing axial distance from end face 131 abutting securement collar 121 in this subsection. The inner lateral surface of coupling jacket 129 thus forms a conical inner surface in this subsection. This conical inner surface forms an abutment surface 133, on which a complementary abutment surface 135 can be applied; abutment surface 135 is formed on the outer surface of measuring probe 103, on the outer lateral surface of cap 119 in the present example, to be more precise. Abutment surface 135 is the result of a continuous decrease of the outer diameter of the outer lateral surface of cap 119 and therewith of the measuring probe 103 within a subsection of measuring probe 103 or cap 119 with increasing distance from the securement collar 121. The outer surface of measuring probe 103 or cap 119 is a conical outer surface in this subsection 141. Both abutment surfaces 133 and 135 lie opposite one another at an axial distance d1 in the installed state of measuring probe 103 for measurement operation and in the basic function state of measuring apparatus 101.

If a fracturing of securement collar 121 occurs in measuring arrangement 101 due a too high pressure at the measuring point or due to material fatigue, unlike the measuring arrangement illustrated in FIG. 2, measuring probe 103 can only move so far in an axial direction facing away from the medium, until the two abutment surfaces 133 and 135 contact one another. Further movement is suppressed. Both abutment surfaces 133 and 135 thus act as a safeguard for the affixing of measuring probe 103.

Figure 4:
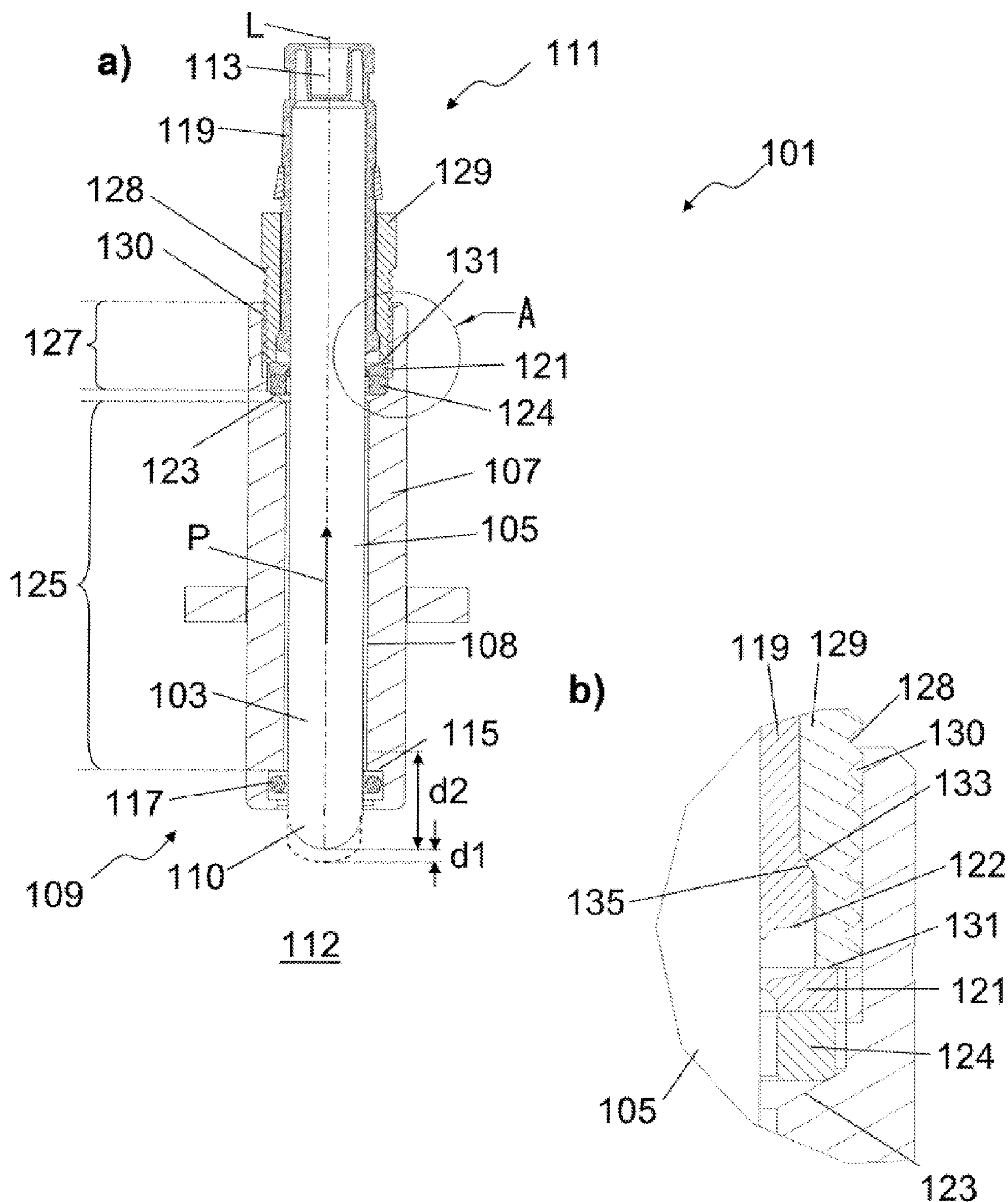
FIG. 4 *a*) is the measuring apparatus of FIG. 3 *a*) in the case of a fracturing of the securement collar.

This is clear in FIGS. 4 *a*) and *b*), which show measuring apparatus 101 from FIGS. 3 *a*) and *b*) after a fracturing of securement collar 121 under influence of a force acting in the direction of arrow P. An enlargement of the section marked A in FIG. 4 *a*) is shown In FIG. 4 *b*). The section shown in FIG.

4 *b*) corresponds to the section shown in FIG. 3 *b*) after the fracturing of the securement collar.

With a fracturing of the securement collar, the action of the process pressure moves measuring probe 103 so far in an axial direction until the abutment surfaces 133 and 135 contact one another. The measuring probe 103 is thus, relative to its original position, shifted within sleeve 107 a distance equal to distance d1, which separates the abutment surfaces 133 and 135 in the original installed state of measuring probe 103 (FIG. 3 *a*) and *b*)) in the basic function state of measuring apparatus 101 before the fracturing of the securement collar.

Ideally, abutment surfaces 133 and 135 are geometrically matched to one another so that they fit together as tightly as possible. Correspondingly, the angle of inclination of the conical surfaces should not deviate from one another more than 5°, preferably less than 1°.

The shifting of measuring probe 103 within sleeve 107 a distance, whose length equals the distance d1, also effects a withdrawal of end section 109 of measuring probe 103 comprising immersion region 110 of probe shaft 105 a corresponding distance. The original position is indicated as a dashed line in FIG. 4 *a*). The length d1 is preferably significantly shorter than the length d2 of the protrusion of end section 109 of probe shaft 105 from sleeve 107 in the basic function state of measuring apparatus 101. In this way, on the one hand, it is assured that with a shifting of measuring probe 103 in an axial direction away from the medium a distance of length d1, end region 109 of probe shaft 105 is still immersed deeply enough in the measured medium 112 so that measurement operation can be maintained at least for a while more until the measuring probe 103, which is defective due to the fracturing of the securement collar, is replaced. On the other hand, the retraction of end section 109 of probe shaft 105 to behind the seal 117 (compare FIG. 2) and an uncontrolled release of the medium is prevented. In the example illustrated in FIG. 4 *a*), the probe shaft 105 still protrudes so far from sleeve 107 after the fracturing of securement collar 121 and with contacting abutment surfaces 133, 135, that the sealing ring 117 lies liquid tightly against the probe shaft 105 as before.

In order to assure a quick replacement of the measuring probe in the case of a fracturing of the securement collar, a vibration sensor or acceleration sensor can be provided in connector assembly 113, on sleeve 107 or coupling jacket 129. In the case of a fracturing of a securement collar a vibration comes from the collision of abutment surfaces 133, 135 with one another; the vibration sensor or the acceleration sensor registers this vibration. Based on the sensor signal, an alarm signal can be output, e.g. by the superordinated unit connected to connector assembly 113.

One other, simple possibility for signaling the fracturing of the securement collar is to provide the section of the lateral surface of measuring probe 103, e.g. cap 119, which is surrounded and hidden in the basic function state of the coupling jacket, with a signal color. In the case of a fracturing of a securement collar and axial shifting of measuring probe 103 in a direction away from the medium, a section of axial length d1 of the lateral surface so colored is pressed out from coupling jacket 129 and is thus visible. In this way, a service person can externally detect a fracturing of the securement collar and take suitable measures.

The invention claimed is:

1. A measuring apparatus comprising:

a measuring probe, which has a cylindrical probe shaft; and a securement apparatus to affix said measuring probe at a measuring point, wherein:

said securement apparatus comprises a sleeve, within which said probe shaft is accommodated at least sectionally;

said measuring probe has a securement collar connected to said probe shaft, said securement collar is held, shape interlocked, between a coupling jacket releasably secured in said sleeve and a counterbearing formed within said sleeve; and a first abutment surface is formed within said coupling jacket and a second abutment surface lying opposite said first abutment surface is formed on said measuring probe, wherein said first abutment surface is so embodied that the inner diameter of said coupling jacket decreases continuously at least in a subsection of said coupling jacket, with increasing axial distance from an end face or ledge of said coupling jacket bearing against said securement collar of said measuring probe, and said second abutment surface is so embodied that the outer diameter of said measuring probe decreases continuously at least in a subsection, with increasing axial distance from said securement collar.

2. The measuring apparatus as claimed in claim 1, wherein:

said first abutment surface lies axially spaced relative to said second abutment surface.

3. The measuring apparatus as claimed in claim 1, wherein:

said counterbearing within said sleeve is formed as an inwardly extending ledge said sleeve;

said ledge is embodied as a transitional region between a first section of sleeve with a first inner diameter and a second section, following said first section of sleeve, with a second inner diameter; and said second inner diameter is larger than said first inner diameter.

4. The measuring apparatus as claimed in claim 3, wherein:

said coupling jacket is at least sectionally arranged within said second section of said sleeve and surrounds a section of said probe shaft.

5. The measuring apparatus as claimed in claim 3, wherein:

said coupling jacket has an external thread, which interacts with an internal thread in said second section of said sleeve, in order to releasably secure said coupling jacket in said sleeve and in order to bring an end face or a radially inwardly extending ledge of said coupling jacket into contact with a face of said securement collar of said measuring probe directly or through interpositioning of a sealing element.

6. The measuring apparatus as claimed in claim 3, wherein:

said measuring probe has an immersion region immersible in a measured medium at a first end region of said probe shaft protruding out of said sleeve; and a sealing ring is arranged within a first section of said sleeve with a first inner diameter, said sealing ring lies against said probe shaft and seals an annular gap formed between said inner lateral surface of said sleeve and said sensor shaft from the measured medium.

7. The measuring apparatus as claimed in claim 6, wherein:

said immersion region has an axial length, which is greater than the distance between said first abutment surface and said second abutment surface.

8. The measuring apparatus as claimed in claim 7, wherein:

the axial length of said immersion region is at least twice as long as the distance between said first and said second abutment surfaces.

9. The measuring apparatus as claimed in claim 8, wherein: the axial length of said immersion region is at least 10 times as long as the distance between said first and said second abutment surfaces.

10. The measuring apparatus as claimed in claim 1, wherein: said sleeve, said probe shaft and said coupling jacket have a shared rotational axis.

11. The measuring apparatus as claimed in claim 1, wherein: said first abutment surface and said second abutment surface are embodied as conical lateral surfaces, which are complementary to one another; and the angle of inclination of both conical lateral surfaces deviate from one another by less than 10°.

12. The measuring apparatus as claimed in claim 1, wherein: the inner lateral surface of said coupling jacket has a conical inner surface within said subsection.

13. The measuring apparatus as claimed in claim 1, wherein: an outer lateral surface of said probe shaft or a section of said measuring probe connected to said probe shaft has a conical outer surface in said subsection.

* * * * *